March 3, 1970     W. K. SPINDLER     3,498,363
METHOD OF MAKING BEARING FOR INDUSTRIAL TRUCK WHEEL
Filed June 27, 1967
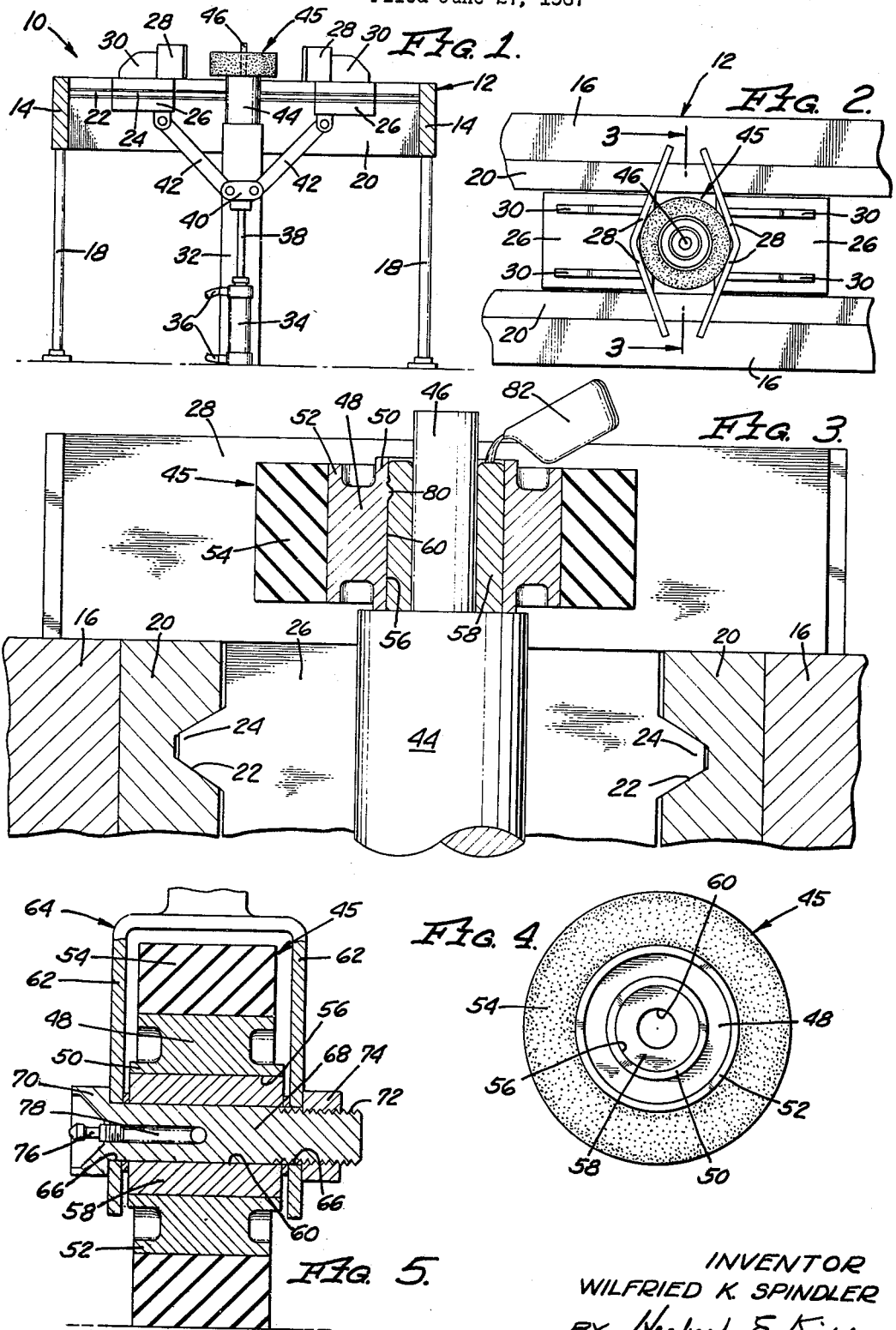
INVENTOR
WILFRIED K. SPINDLER
BY Herbert E. Kidder
AGENT United States Patent Office 3,498,363
Patented Mar. 3, 1970

3,498,363
METHOD OF MAKING BEARING FOR INDUSTRIAL TRUCK WHEEL
Wilfried K. Spindler, 16652 Queenside Drive, Covina, Calif. 91722
Filed June 27, 1967, Ser. No. 649,178
Int. Cl. B22d *19/08*
U.S. Cl. 164—112                    1 Claim

ABSTRACT OF THE DISCLOSURE

A poured-in-place babbitt metal bearing for the wheel of an industrial truck of the type used in food processing industries, where bearings are exposed to severe corrosion due to frequent washing and steam-cleaning, and exposure to organic acids and processing chemicals. Babbitt metal is poured into the bearing cavity in the hub of the wheel, with a molded-in central bore of a diameter to receive the axle shaft. Bearing is locked to the wheel hub by means of a local discontinuity in the surface of the cavity, which is embedded in the babbitt metal.

BACKGROUND OF THE INVENTION

Industrial trucks have long been used in the food processing industrites such as packing houses, dairies, and the like to transport loads of food material in various stages of processing, from one area of a plant to another. Such trucks usually consist of a chassis, or framework, mounted on four wheels (although sometimes three wheels may be used) of which two or more wheels are castered, so that the truck can be propelled in any desired direction. Typically, the wheels of these trucks are about 4" in diameter, and have solid rubber tires that are about 2" wide. As the trucks are usually pushed around by hand, the wheels are generally equipped with ball bearings or needle bearings, in order to reduce friction and thereby minimize the effort required to push heavily loaded trucks.

The truck wheels frequently runthrough water and processing liquids, besides being constantly exposed to edible oils, food liquids, and processing chemicals. Moreover, in the interests of sanitation, the trucks are frequently washed down or steam-cleaned, and this means that the wheel bearings are often wet with water, sometimes containing detergent or other cleaning agents. As a result of these environmental conditions, anti-friction bearings have an extremely short life, and must be replaced after only a few months of service.

The replacement of bearings in industrial truck wheels is an item of considerable expense due to the relatively high cost of the bearings and their short service life. Anti-friction bearings must be stocked in various sizes to take care of different sizes and makes of wheels. Such bearings are expensive, and the replacement bearings last no longer than the original bearings. Sleeve bushings of bronze or porous-metal are somewhat better than anti-friction bearings from the standpoint of corrosion resistance, but require extensive machineing operations to turn them down to size and press them into place. While less expensive than anti-friction bearings, they are still relatively expensive, when the installed cost is figured.

SUMMARY OF THE INVENTION

The present invention is concerned with a new and improved bearing for industrial truck wheels, and method for producing the same. The primary object of the invention is to provide a bearing for industrial truck wheels, which is completely resistant to cororsion caused by the environmental conditions mentioned earlier; which is inexpensive to install; and which has a long, trouble-free service life.

Another object of the invention is to provide a bearing of the class described which can be installed in any size or make of industrial truck wheel without special machining operations, to fit the bearing into the hub cavity, or to size the bearing surface to fit its axle shaft.

These objects are achieved by the extremely simple, yet unique process of pouring molten babbitt metal directly into the hub cavity of the wheel, with a cylindrical mandrel of the same diameter as the axle shaft positioned at the center of the cavity so as to form a cylindrical bore in the solidified bearing metal of exactly the same size as the axle shaft that will be received within the bore. Thus, when the wheel is removed from the mandrel, it is completely finished and ready to be mounted on the truck.

Since babbitt metal is an alloy of tin, antimony, lead and/or copper, it is virtually cororsion-proof and unaffected by moisture, food acids, edible fats, detergents or cleaning agents, processing chemicals, or other corrosive agents commonly found around food processing plants. The babbitt metal bearing is preferably locked to the hub of the wheel by producing a local discontinuity in the surface of the hub cavity, which becomes imbedded in the babbitt metal.

Other objects and advantages of the invention will become apparent to those skilled in the art upon consideration of the following detailed description of the preferred embodiment thereo.

DESCRIPTION OF THE DRAWINGS

FIGURE 1 is a side elevational view of a machine for producing a bearing in an industrial truck wheel, which is shown mounted on the machine, a portion of the near side of the machine being removed to show certain details thereof;

FIGURE 2 is a slightly enlarged fragmentary top plan view of the same, showing the centering device closed against opposite sides of the truck wheel;

FIGURE 3 is a further enlarged, fragmentary sectional view, taken at 3—3 in FIGURE 2;

FIGURE 4 is an eltvational view of an industrial truck wheel having the improved bearing of my invention mounted therein; and FIGURE 5 is a transverse vertical section through an industrial truck wheel embodying the invention, shown as it appears when mounted on the truck.

DESCRIPTION OF A PREFERRED EMBODIMENT

In FIGURES 1, 2 and 3 of the drawings, the machine used in the practice of the invention is designated in its entirety by the reference numeral 10, and comprises a generally rectangular frame 12 made up of horizontal end members 14, which are joined together by parallel side members 16. The frame 12 is supported at its four corners on legs 18.

Fixed to the inner sides of the side members 16 are bearing plates 20, the inner faces of which are provided with V-shaped ways 22, which receive correspondingly V-shaped bearings 24 projecting laterally from opposite sides of two sliding machine heads 26. Each of the machine heads 26 has an upstanding V-shaped arrangement of steel plates 28 mounted on its top side, which is braced by a back-up plate 30.

Fixed to the side frame members 16 at the midpoint thereof and extending downwardly to the floor is a vertical post 32 having an air cylinder 34 mounted on its lower end. The air cylinder 34 is connected by pipes 36 to a control valve (not shown) and high pressure airline, and has the usual piston (not shown) and piston rod 38, the latter projecting upwardly from the top end of the cylinder. The piston rod 38 has a head 40 mounted on its upper end, which is connected by upwardly diverging links 42 to the sliding machine heads 26.

Mounted on top of the post 32 is cylindrical holder 44, upon which the truck wheel 45 is placed when a bearing is to be installed therein, as shown in the drawings. Projecting upwardly from the center of the holder 44 is a cylindrical mandrel 46, the diameter of which is substantially the same as the diameter of the axle shaft upon which the wheel will be mounted.

Wheel 45 is typically shown as a heavy, cast iron body 48 having a central hub portion 50 and rim 52. Vulcanized onto the rim 52 is a solid rubber tire 54, preferably of oil-resistant, synthetic rubber. The hub 50 is formed with a cylindrical bearing cavity 56, which extends through from one side to the other, and most truck wheels have heretofore been equipped with anti-friction bearings, the outer races of which have been pressed into the center cavity 56. The bearing of the present invention, whether original equipment in the wheel or replacement thereof, is designated by the reference numeral 58, and comprises an annular, sleeve-like body of babbitt metal which has been poured into the cavity 56 and completely fills the same except for a central cylindrical bore 60 through which the axle shaft is to pass.

FIGURE 5 shows the wheel as it appears when mounted between the side arms 62 of a caster fork 64 on an industrial truck. Extending through aligned holes 66 in arms 62, and through the central bore 60 in the bearing 58, is an axle shaft 68. At one end of the axle shaft is a hexagonal head 70, while the other end is threaded at 72 to receive a nut 74. The axle shaft 68 is drilled axially from the head end thereof and tapped to receive a lubrication fitting 76. The drilled hole 78, together with an intersecting radial branch passageway at the center of the bearing, form a lubricating passageway through which wheel grease may be forced into the space between the bearing 58 and the axle shaft.

The method of installing the bearing 58 in the wheel hub is as follows:

First, the bearing cavity 56 is cleaned of any dirt and loose scale, and a local discontinuity 80 (see FIG. 3) is formed in the surface of the cavity, as by touching the surface with an arc welding electrode to form a slight crater, or by building up a small projection of weld material, the purpose of which is to embed in the babbitt metal and "key" the latter against turning within the cavity 56.

The wheel 45 is then placed on its side on the holder 44, with the mandrel 46 projecting up through the center of the cavity 56. Mandrel 46 is the same diameter as axle shaft 68, and its length is somewhat greater than the length of hub 50, so that the mandrel projects above the latter. The valve for the air cylinder 34 is then actuated, causing the piston rod 38 to pull downwardly, thereby pulling the two machine heads 26 inwardly against opposite sides of the wheel. The V-shaped plates 28 act to center the wheel with respect to the mandrel 46, so that the mandrel is at the center of the circle defined by the outer surface of the rubber tire 54.

A ladle 82 of molten babbitt metal is then poured carefully through the open top end of the cavity 56 until the latter is filled. The babbitt metal is allowed to cool until it has thoroughly solidified, and the machine heads 26 are backed off by admitting air to the bottom end of the air cylinder 34. The wheel 45 is then removed from the mandrel 46, and is ready for installation on a truck.

While I have shown and described in considerable detail what I believe to be the preferred embodiment of the invention, both as to the wheel bearing itself and as to the method of producing the same, it will be evident to those skilled in the art that various changes can be made without departing from the scope of the claims that follow.

I claim:

1. The method of providing a bearing for an industrial truck wheel, wherein said wheel has a central hub bearing cavity in the hub and turns on a cylindrical axle shaft of smaller diameter than said cavity, comprising the steps of:
  (a) mounting said wheel horizontally on a supporting holder 44 with said hub bearing cavity closed at the bottom end and open at the top, said holder having a central, upstanding cylindrical mandrel 46 of substantially the same diameter as said axle shaft;
  (b) engaging the outer periphery of said wheel on opposite sides thereof by centering devices 28 and moving said devices horizontally inwardly toward the center of said mandrel until the wheel is exactly centered with respect to said mandrel;
  (c) pouring molten babbitt metal into said bearing cavity in the hub through the other end, and allowing said metal to solidify;
  (d) and removing said wheel from said mandrel.

References Cited

UNITED STATES PATENTS

| | | | |
|---|---|---|---|
| 286,754 | 10/1883 | Wilder | 249—56 |
| 420,664 | 2/1890 | Phelps. | |
| 636,464 | 11/1899 | Snyder. | |
| 1,164,172 | 12/1915 | Denney. | |
| 1,663,642 | 3/1928 | Spousta | 249—56 X |
| 1,200,245 | 10/1916 | Sevel | 164—112 |
| 1,494,099 | 3/1924 | Cole. | |
| 1,590,392 | 6/1926 | Peters. | |
| 198,707 | 12/1877 | Taylor | 164—112 |

OTHER REFERENCES

| | | |
|---|---|---|
| 371,559 | 4/1932 | Great Britain. |
| 407,120 | 3/1934 | Great Britain. |

J. SPENCER OVERHOLSER, Primary Examiner

V. R. RISING, Assistant Examiner

U.S. Cl. X.R.

29—149.5; 164—98, 334, 397; 249—56, 87, 88